United States Patent [19]

Simond

[11] Patent Number: 5,538,354
[45] Date of Patent: Jul. 23, 1996

[54] TELESCOPING TUBULAR ASSEMBLY

[76] Inventor: Ludger Simond, Les Bossons, 74400 Chamonix Mont Blanc, France

[21] Appl. No.: 318,774
[22] PCT Filed: Apr. 14, 1993
[86] PCT No.: PCT/FR93/00322
 § 371 Date: Sep. 30, 1994
 § 102(e) Date: Sep. 30, 1994
[87] PCT Pub. No.: WO93/21448
 PCT Pub. Date: Oct. 28, 1993

[30] Foreign Application Priority Data

Apr. 14, 1992 [FR] France .................. 92 04873

[51] Int. Cl.⁶ .................. A63C 11/22; F16B 7/14
[52] U.S. Cl. .................. 403/109; 403/374; 280/823; 280/819
[58] Field of Search .................. 248/231.2, 316.2, 248/231.3, 414, 231.1; 403/109, 373, 374, 104; 280/819, 820, 822, 823

[56] References Cited

U.S. PATENT DOCUMENTS

| 4,134,703 | 1/1979 | Hinners .................. 280/823 X |
| 4,238,164 | 12/1980 | Mazzolla .................. 403/109 |
| 4,896,687 | 1/1990 | Segal et al. .................. 403/109 X |
| 5,458,427 | 10/1995 | Simond .................. 403/109 |

FOREIGN PATENT DOCUMENTS

| 0217556 | 4/1987 | European Pat. Off. . |
| 0314357 | 5/1989 | European Pat. Off. . |
| 0423990 | 4/1991 | European Pat. Off. . |
| 1256016 | 2/1961 | France . |
| 2475911 | 8/1981 | France .................. 280/823 |
| 2402428 | 8/1974 | Germany .................. 280/823 |
| 267177 | 3/1950 | Switzerland .................. 280/823 |
| WO92/20413 | 11/1992 | WIPO .................. 403/109 |

Primary Examiner—Anthony Knight
Attorney, Agent, or Firm—William H. Eilberg

[57] ABSTRACT

A locking device for mutually locking two adjacent sections of a telescoping tubular assembly. An axial extension (7) on one of the tubular sections (2) supports an expandable ring (10) received in the other tubular section (1). A nut (17) is non-rotatably slidable in the ring (10) and screwed onto a threaded portion of the axial extension (7). The ring (10) is itself non-rotatable relative to the first tubular section (1). Relative rotation between the tubular sections (1, 2) moves the nut (17) towards the second tubular section (2) and causes the ring (10) to be expanded by tapered portions (15, 16). The ring is deformed in several places to spread the frictional load.

8 Claims, 2 Drawing Sheets

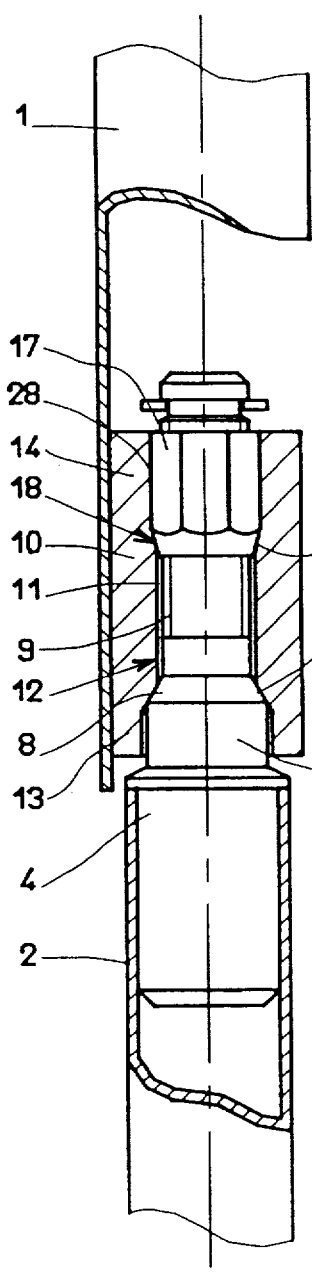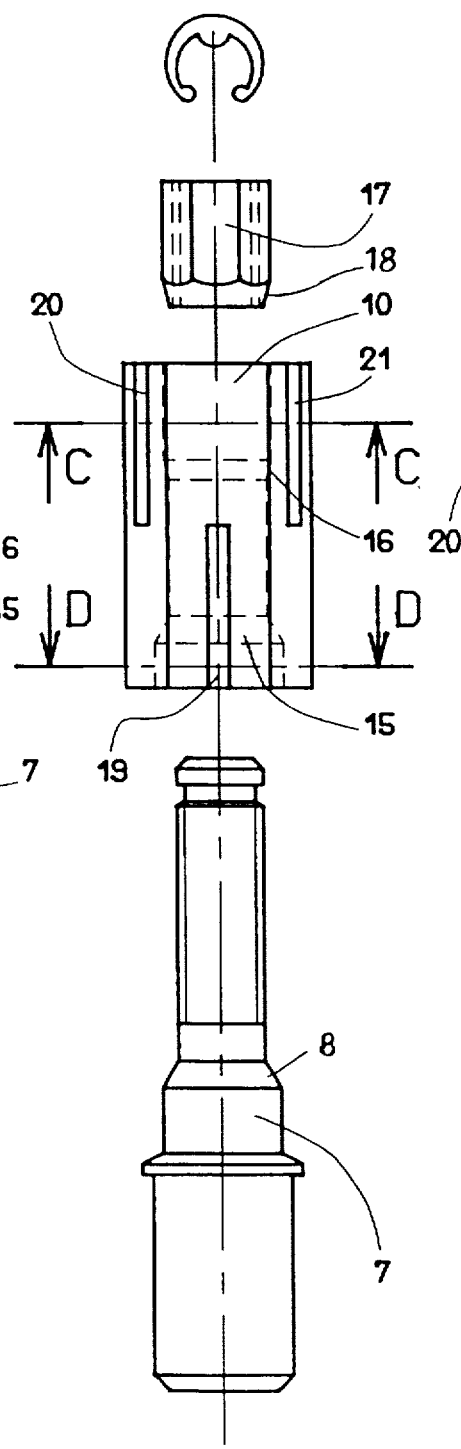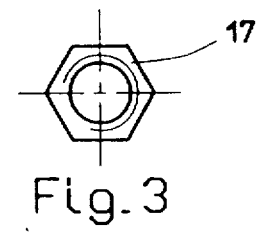
Fig. 3
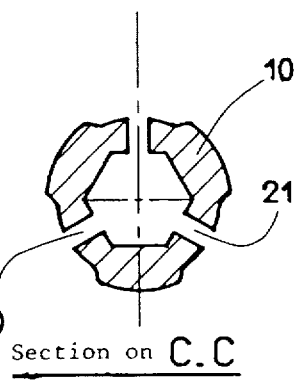
Section on C.C
Fig. 4
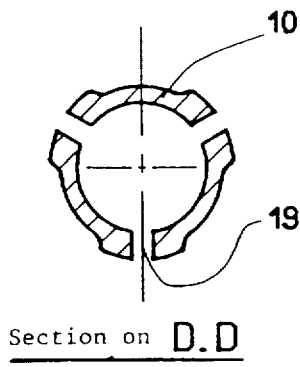
Section on D.D
Fig. 5
Fig. 1
Fig. 2

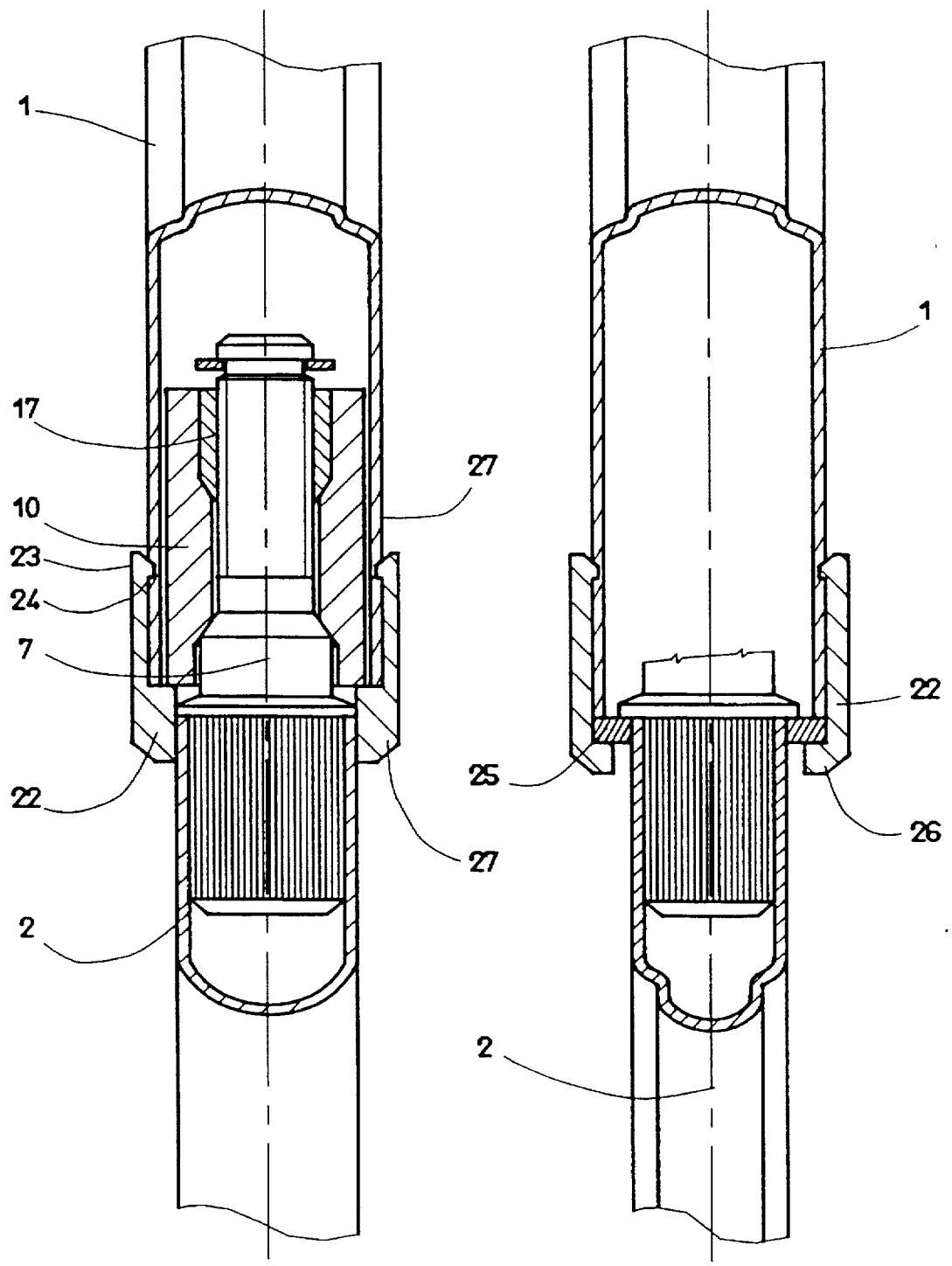

TELESCOPING TUBULAR ASSEMBLY

FIELD OF THE INVENTION

The present invention concerns telescopic rods comprising a plurality of successive tubular sections sliding one inside the other between a retracted position and a deployed position.

Telescopic rods are used in various fields and among other things allow length adjustment within a selected range of variation.

The invention is more particularly concerned with a telescoping tubular assembly of this kind comprising at least one relatively larger diameter first tubular section and one relatively smaller diameter second tubular section, the second tubular section having an inside end accommodated inside the first tubular section and being free to rotate and to slide in the first tubular section between a retracted position and deployed position.

An earlier proposal for locking relative sliding between two successive tubular sections is to use an expandable ring, as described in document EP-A-0 217 556, for example. The ring is mounted inside the first tubular section and is compressed axially between an axial end-piece fastened to the second tubular section and opposed clamping means screwing onto the axial end-piece, corresponding conical bearing surfaces expanding the ends of the ring which are pressed against the inside surface of the first tubular section. Relative rotation between the clamping means and the first tubular section is prevented to cause screwing of the clamping means upon relative rotation of the tubular members. The expansion of the ring produces friction forces opposing axial displacement of the tubular sections relative to each other. However, a prior art expandable ring device of this kind has the drawback that a relatively locking effect is due to a small surface area of the expandable ring. The locking effect is consequently insufficient for many applications.

SUMMARY OF THE INVENTION

The problem to which the present invention is addressed is that of increasing the locking force obtained by means of an expandable locking ring without excessively increasing the number of parts required or the difficulty of manufacture or assembly and without increasing the resistance to axial sliding when the device is unlocked.

To this end, the invention provides means for causing expansion of the ring in two axially offset areas of significantly increased length, distributing the deformation of the ring appropriately and increasing significantly the surface area of friction between the ring and the first tubular section into which it is inserted.

To this end, clamping means are provided comprising a head sliding freely in the first tubular section and bearing against an end surface of the ring. The ring includes a central part in which the axial hole is substantially cylindrical and two end parts in which the axial hole is of greater diameter and is joined to the hole of the central part by respective first and second internal conical bearing surfaces. The first internal conical bearing surface of the ring bears on a corresponding external conical bearing surface of the axial end-piece. The second internal conical bearing surface of the ring bears on a corresponding external conical bearing surface of the head of the clamping means. Longitudinal slits are provided in the ring in the two areas corresponding to the internal conical bearing surfaces of the ring. The slits occupy substantially half the length of the ring, starting from each end, and the internal conical bearing surfaces of the ring are arranged substantially at one third and two thirds of the length of the ring.

Various means may be used to join the head of the clamping means to the second tubular section.

BRIEF DESCRIPTION OF THE DRAWINGS

Other objects, features and advantages of the present invention emerge from the following description of specific embodiments of the invention given with reference to the appended drawings in which:

FIG. 1 is a front view in partial cross-section of the locking area between two successive sections of a telescoping tubular assembly in accordance with the invention;

FIG. 2 is an exploded front view of the component parts of the locking area from FIG. 1;

FIG. 3 shows the transverse cross-section of the nut from FIG. 2;

FIG. 4 shows the locking ring in cross-section on the plane C—C in FIG. 2;

FIG. 5 shows the locking ring in cross-section on the plane D—D in FIG. 2;

FIG. 6 is a front view in partial cross-section showing a sealing structure between two successive tubular sections in a first embodiment of the invention; and FIG. 7 shows a second embodiment of the sealing means between two successive tubular sections.

DESCRIPTION OF THE PREFERRED EMBODIMENTS

In the embodiment shown in FIGS. 1 to 5 the telescoping tubular assembly comprises at least one relatively larger diameter first tubular section 1 and one relatively smaller diameter second tubular section 2. The second tubular section 2 has an inside end 4 accommodated inside the first tubular section 1 which is free to rotate and slide in the first tubular section 1 between a retracted position and a deployed position. The inside end 4 of the second tubular section 2 is intended to remain at all times inside the first tubular section 1.

The second tubular section 2 carries an axial end-piece 7 aligned with its inside end 4 and including a first generally conical bearing surface 8 extended by a smaller diameter screwthreaded part 9.

A locking ring 10 comprises an axial hole 11 through which the axial end-piece 7 passes. The axial hole 11 comprises a generally cylindrical central part 12 and two end parts 13 and 14 of greater diameter and joined to the hole in the central part 12 by a first internal conical bearing surface 15 of the ring and by a second internal conical bearing surface 16 of the ring, respectively. A nut 17 is screwed onto the screwthreaded part 9 of the axial end-piece 7. The nut 17 has a polygonal cross-section, for example a hexagonal cross-section as shown in FIG. 3, and slides with a small clearance in a corresponding axial housing 28 of the ring 10. Thus the nut 17 can slide freely in the axial direction inside the housing 28 but cannot rotate about this axis because its non-circular outside surface is immobilized against a similar inside surface of the housing 28. The nut 17 is thus non-rotatable relative to the ring 10 but can slide axially relative to the ring.

The ring 10 is advantageously made from a material conferring some elasticity on it. Its shape is such that in an unlocked position at least part of its outside surface bears elastically against the inside surface of the first tubular member 1.

The end of the nut 17 comprises a conical annular surface 18 forming an external conical bearing surface which bears against the second internal conical bearing surface 16 of the ring 10.

Respective series of longitudinal slits are formed in the two end parts of the ring 10, as shown in FIGS. 2 to 5: referring to FIG. 2, for example, near the first end of the ring 10 is a longitudinal slit 19 of the first series of slits, the length of which is substantially half that of the ring 10. Likewise, FIG. 2 shows in the area of the second end of the ring 10 longitudinal slits 20 and 21 of the second series of slits.

The slits such as the slit 19 of the first series of slits are advantageously interleaved with the slits such as the slits 20 and 21 of the second series of slits.

The inside conical bearing surfaces 15 and 16 of the ring 10 are advantageously and substantially provided at one third and two thirds of the length of the ring.

Locking the rotation of the ring 10 can be achieved merely by friction between the outside surface of the ring 10 and the inside surface of the first tubular section 1. Accordingly, tubular sections with a circular transverse cross-section can be used.

As an alternative to this, means for locking rotation of the ring 10 can be provided between the inside surface of the first tubular section 1 and the outside surface of the ring 10. For example, one or more longitudinal ribs projecting from the inside surface of the first tubular section 1 can slide in corresponding peripheral grooves on the ring 10.

The ring 10 can advantageously be made from a plastics material so that it has the appropriate capacity for deformation near its slit ends.

The specific arrangement of the slits 19–21 and the conical bearing surfaces 15 and 16 produces a one-piece ring 10 which has significantly improved locking capabilities. These improved capabilities are probably due to the improved distribution of the friction surfaces between the ring 10 and the first tubular section 1.

FIG. 6 shows a first embodiment of means providing a seal between the first tubular section 1 and the second tubular section 2.

The seal is provided by a sealing ring 22 fitted to the overlapping end 27 of the first tubular section 1 relative to which it cannot move in the axial direction but relative to which it is free to rotate. A curved end 26 of the ring caps the edge of the first tubular section 1 and bears against the peripheral surface of the second tubular section 2. To immobilize it in the axial direction the sealing ring 22 comprises an inside lip 23 which engages in an outside annular groove 24 on the first tubular section 1.

In the FIG. 7 embodiment the seal is provided by a sealing ring 22 which covers the end of the first tubular section 1. In this case the ring 22 is prevented from moving relative to the first tubular section 1 in translation and in rotation. The curved end 26 of the ring 22 faces the end of the second tubular section 2. However, this end 26 of the ring does not touch the outside wall of the second tubular section 2, relative to which it is free to rotate.

A circular spacer 25 forming a seal is inserted between the second tubular section 2 and the locking ring 22 to provide the seal and is therefore capped by the curved end 26 of the ring 22 and accommodated between said curved end 26 and the edge of the first tubular section. The advantage of this is that the ring 22 does not turn relative to the first tubular section 1 upon relative rotation of the tubular sections. The spacer slides on the second tubular section 2 and provides a good seal, even if the transverse cross-section of the tubular members is not circular.

In the foregoing embodiments of the invention the head of the clamping means is formed by the nut 17 which is joined to the second tubular member by a screwthreaded protruding axial part 9 of the axial end-piece.

As an alternative to this, the clamping means for the ring 10 can comprise a screw whose head forms the head 17 of the clamping means and whose screwthreaded shank is screwed into an axial screwthreaded bore in the axial end-piece 7.

The present invention is not limited to the embodiments explicitly described but encompasses various variants and generalizations thereof within the scope of the following claims.

I claim:

1. Telescoping tubular assembly comprising:

at least one relatively larger diameter first tubular section (1) and one relatively smaller diameter second tubular section (2), the second tubular section (2) having an inside end (4) accommodated inside the first tubular section (1) and being free to rotate and to slide in the first tubular section (1) between a retracted position and a deployed position, an axial end-piece (7) including a generally conical bearing surface (8) in alignment with the inside end (4) of the second tubular section (2) inside the first tubular section (1), an expandable locking ring (10) with a central part (12) through which passes a substantially cylindrical axial hole (11) between a first generally conical inside bearing surface (15) adapted to bear against the generally conical bearing surface (8) of the axial end-piece (7) and a conical internal second bearing surface (16) at the opposite end, the ring including two series of longitudinal slits (19, 20, 21) allowing it to deform radially, axial clamping means (17) comprising a head having a generally conical annular surface (18) adapted to bear against the second internal conical bearing surface (16) of the ring, the axial clamping means (17) being adapted to push the ring (10) selectively against the generally conical bearing surface (8) of the axial end-piece (7), so deforming the ring radially outwards to press it against the inside wall of the first tubular section (1), connecting means for fastening the clamping means (17) and the second tubular section (2) together axially, characterized in that:

the ring (10) includes two end parts (13, 14) in which the axial hole is of greater diameter and is joined to the hole in the central part (12) by the first internal conical bearing surface (15) of the ring and the second internal conical bearing surface (16) of the ring, respectively, the slits occupy substantially half the length of the ring (10), the internal conical bearing surfaces (15, 16) are arranged substantially at one third and two thirds of the length of the ring (10).

2. Telescoping tubular assembly according to claim 1 characterized in that:

the slits (19) of the first series of slits are interleaved with the slits (20, 21) of the second series of slits.

3. Telescoping tubular assembly according to claim 1, characterized in that the clamping means (17) comprise a screw whose head forms the head of the clamping means (17) and whose screwthreaded shank is screwed into an axial screwthreaded hole of the axial end-piece.

4. Telescoping tubular assembly according to claim 1 characterized in that the clamping means (17) comprise a nut forming the head of the clamping means (17) and screwing onto a screwthreaded protruding axial part (9) of the axial end-piece (7) passing through the ring (10).

5. Telescoping tubular assembly according to claim 1 characterized in that longitudinal ribs are provided on the inside surface of the first tubular section (1), said longitudinal ribs engaging in corresponding longitudinal grooves on the ring (10) to prevent the ring (10) from rotating relative to the first tubular section (1).

6. Telescoping tubular assembly according to claim 1 characterized in that a seal is provided between the first tubular section (1) and the second tubular section (2) by a sealing ring (22) fitted around the overlapping end (27) of the larger diameter first tubular section (1) relative to which it is prevented from moving in translation, the sealing ring (22) including a curved end (26) which caps the edge of the first tubular section (1) and bears against the peripheral surface of the second tubular section (2).

7. Telescoping tubular assembly according to claim 1 characterized in that a seal is provided between the first tubular section (1) and the second tubular section (2) by a sealing ring (22) fitted around the end of the larger diameter first tubular section (1) relative to which it is prevented from rotating and from moving in translation, the sealing ring (22) including a curved end (26) adapted to cap an annular spacer (25) inserted between the curved end (26) of said ring (22) and the edge of the larger diameter first tubular section (1), the spacer being able to slide on the smaller diameter second tubular section (2).

8. Telescoping tubular assembly comprising:

at least one relatively larger diameter first tubular section (1) and one relatively smaller diameter second tubular section (2), the second tubular section (2) having an inside end (4) accommodated inside the first tubular section (1) and being free to rotate and to slide in the first tubular section (1) between a retracted position and a deployed position, an axial end-piece (7) including a generally conical bearing surface (8) in alignment with the inside end (4) of the second tubular section (2) inside the first tubular section (1), an expandable locking ring (10) with a central part (12) through which passes a substantially cylindrical axial hole (11) between a first generally conical inside bearing surface (15) adapted to bear against the generally conical bearing surface (8) of the axial end-piece (7) and a conical internal second bearing surface (16) at the opposite end, the ring including two series of longitudinal slits (19, 20, 21) allowing it to deform radially, axial clamping means (17) comprising a head having a generally conical annular surface (18) adapted to bear against the second internal conical bearing surface (16) of the ring, the axial clamping means (17) being adapted to push the ring (10) selectively against the generally conical bearing surface (8) of the axial end-piece (7), so deforming the ring radially outwards to press it against the inside wall of the first tubular section (1), connecting means for fastening the clamping means (17) and the second tubular section (2) together axially, wherein the ring (10) includes two end parts (13, 14) in which the axial hole is of greater diameter and is joined to the hole in the central part (12) by the first internal conical bearing surface (15) of the ring and the second internal conical bearing surface (16) of the ring, respectively, wherein the slits occupy substantially half the length of the ring (10), wherein the internal conical bearing surfaces (15, 16) are arranged substantially at one third and two thirds of the length of the ring (10), and wherein the head of the clamping means (17) has a polygonal cross-section and is inserted in an axial housing (28) of the ring (10) having a corresponding polygonal cross-section preventing rotation of the clamping means (17) relative to the ring (10).

* * * * *

UNITED STATES PATENT AND TRADEMARK OFFICE
CERTIFICATE OF CORRECTION

PATENT NO. : 5,538,354

DATED : July 23, 1996

INVENTOR(S) : Ludger Simond

It is certified that error appears in the above-identified patent and that said Letters Patent is hereby corrected as shown below:

On the cover page of the patent, left-hand column, item [22], delete "Apr. 14, 1993" and insert instead --Mar. 31, 1993--.

Signed and Sealed this

Tenth Day of December, 1996

Attest:

BRUCE LEHMAN

*Attesting Officer*     *Commissioner of Patents and Trademarks*